United States Patent

[11] 3,562,406

[72] Inventors Edwin C. Uhlig;
 Robert C. Kohrn, South Bend, Ind.
[21] Appl. No. 810,064
[22] Filed Jan. 21, 1969
 Division of Ser. No. 685,076, Nov. 22, 1967.
[45] Patented Feb. 9, 1971
[73] Assignee Uniroyal, Inc.
 New York, N.Y.
 a corporation of New Jersey

[54] END COUPLING FOR FAIRED CABLE
 8 Claims, 10 Drawing Figs.
[52] U.S. Cl. .................................. 174/74,
  24/122.6, 24/126
[51] Int. Cl. ................................. H02g 15/02,
  F16g 11/05
[50] Field of Search ....................... 174/70, 74,
  79; 24/122.3, 122.6, 126, 126K, 126L, 126.3;
  287/82, 114

[56] References Cited
 UNITED STATES PATENTS
1,440,504  1/1923  Snow .......................... 24/126(L)
2,041,385  5/1936  Van Laanen, Jr ........... 24/126(.3)UX
2,689,389  9/1954  Sunderland ................. 24/122.6
 FOREIGN PATENTS
Ad. 51,653  12/1942  France ....................... 24/126(.3)
 538,682  8/1941  Great Britain .............. 24/122.6

Primary Examiner—Laramie E. Askin
Attorney—Norbert P. Holler

ABSTRACT: An end coupling for connecting faired underwater guidance cables to associated structures, e.g. submerged detection and exploration devices, is disclosed. The cable body, which has the cross-sectional contours of an airfoil, includes a relatively less flexible, resin and filament forward strength member, preferably generally channellike or U-shaped in cross section, and a relatively more flexible, syntactic foam aft or tail member. In the manufacturing process, extra lengths of the filaments are left to protrude from the ends of the final cable body, and the coupling construction includes separable telescoping elements between which the filaments may be threaded and clamped.

PATENTED FEB 9 1971 3,562,406
SHEET 1 OF 3
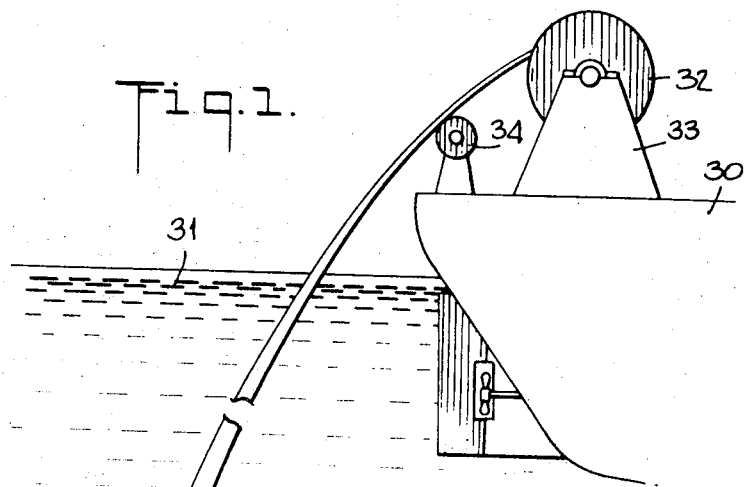
Fig.1.
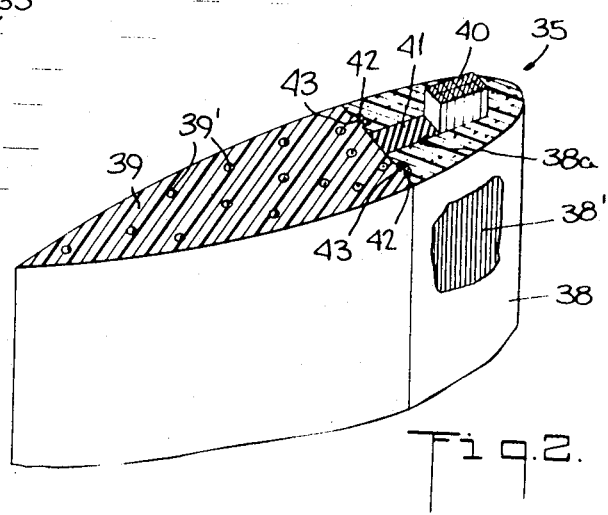
Fig.2.
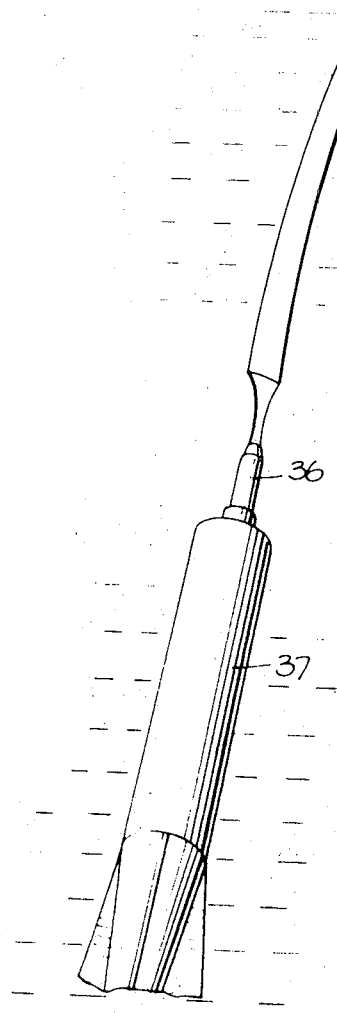
INVENTORS
EDWIN C. UHLIG
ROBERT C. KOHRN
Norbert P. Holler
ATTORNEY

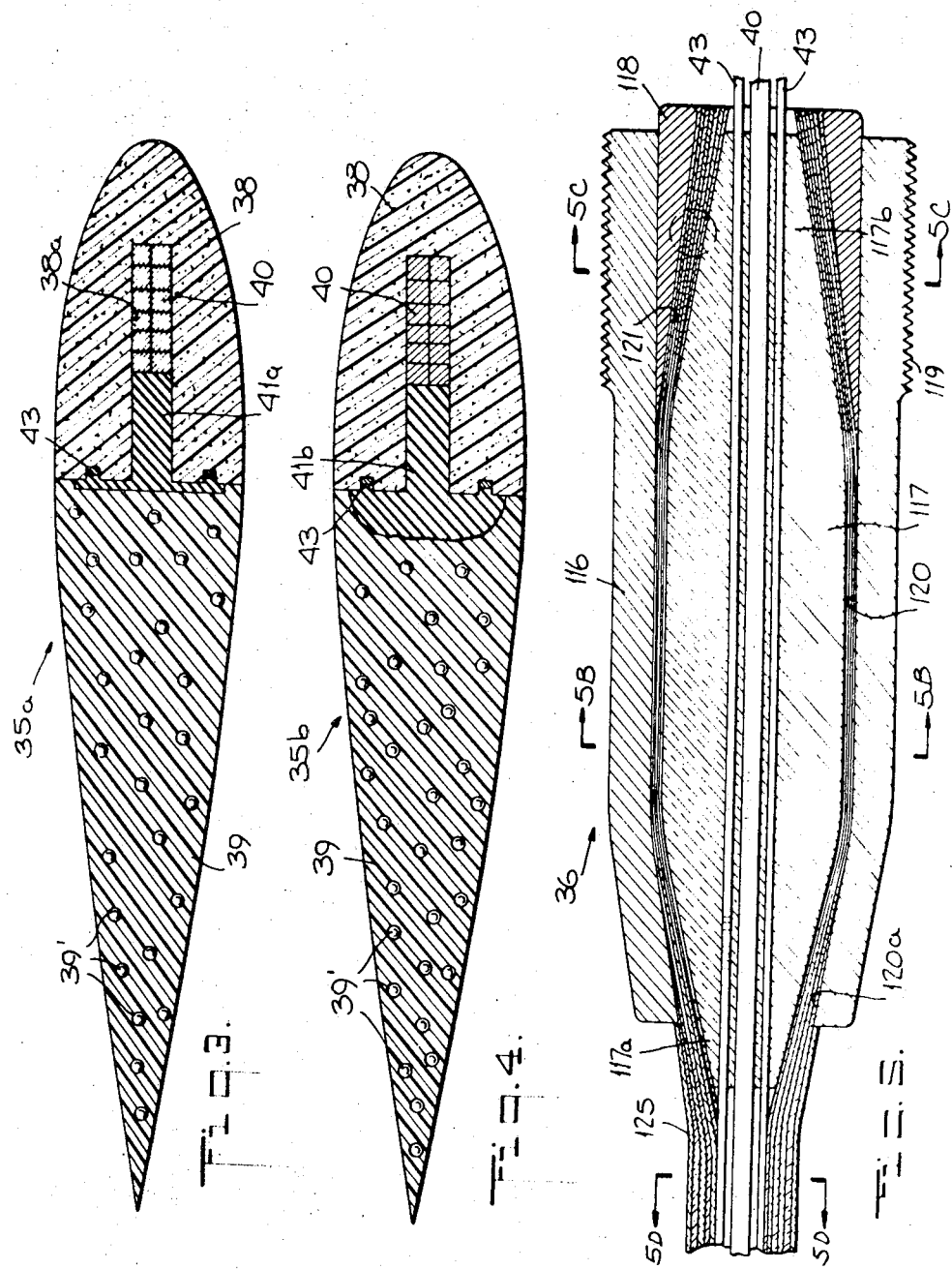

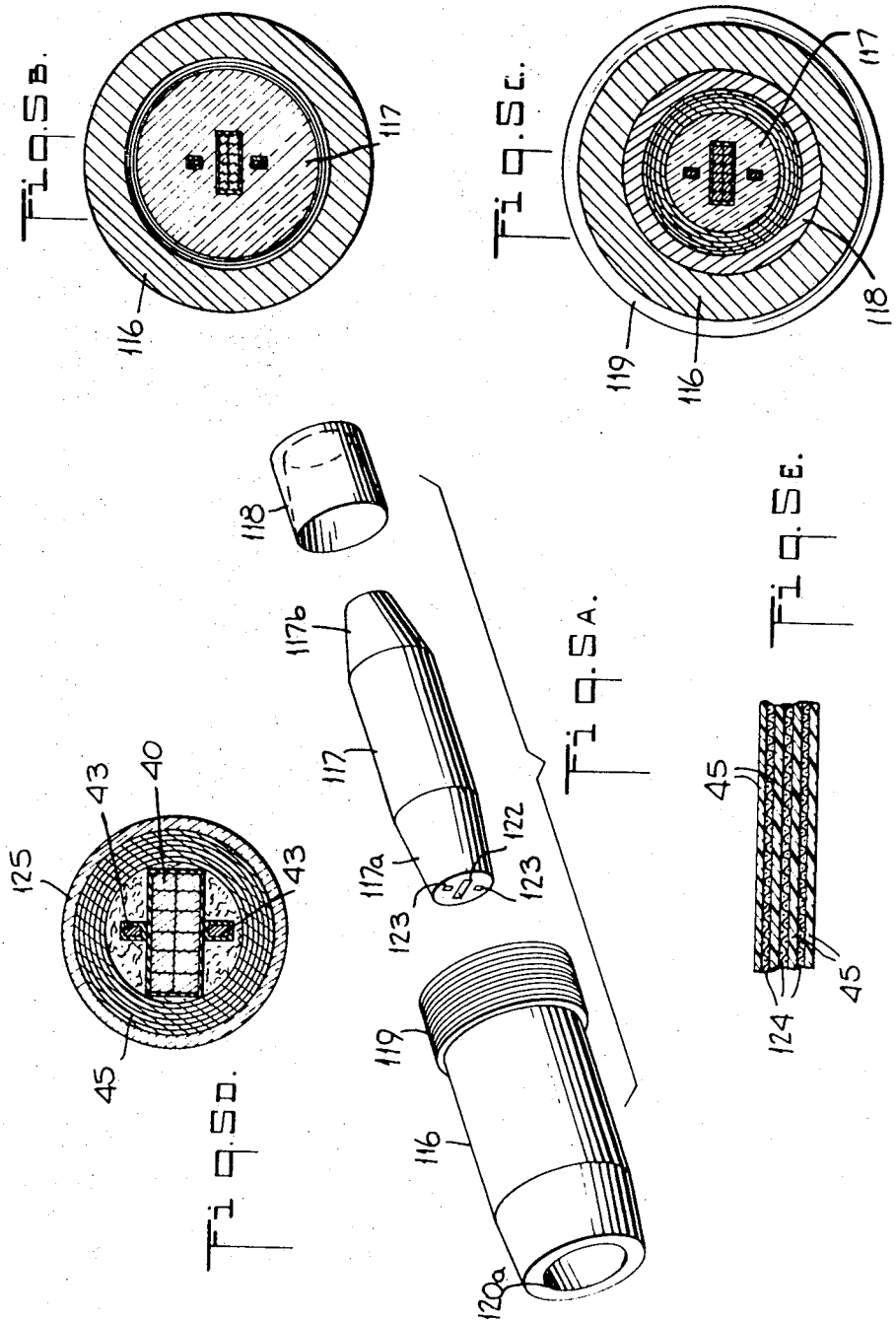

END COUPLING FOR FAIRED CABLE

This application is a division of application Ser. No. 685,076, filed Nov. 22, 1967

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

Generally speaking, as disclosed in Loshigian U.S. Pat. No. 3,443,020 based on an application filed of even date with the aforesaid application Ser. No. 685,076 and assigned to the assignee of the instant application, the type of faired cable to which the present invention pertains has the outer cross-sectional contours of an airfoil, the forward part of the cross section being constituted by or including a rearwardly open channellike or substantially U-shaped relatively less flexible strength member, and the aft part of the cross section being attached to the rearwardmost end of the strength member, e.g. at the ends of the legs of the U or flanges of the channel, and having the form of a relatively more flexible tail of substantially triangular shape. The strength member is made of high modulus filaments in a resin matrix, such as glass filaments in an epoxy or epoxy/polyurethane resin, and the aft part or tail section is made of syntactic foam, preferably such as the cured end product of a mixture of a liquid polyether polyurethane composition and glass microspheres. Suitable electrical conductors are incorporated in the strength member portion of the cable body. The described faired cable construction enables a submerged detection or exploration device connected thereto to be driven and steered by remote control or through the intermediary of the cable itself so as to run ahead or abreast of the surface command ship or control vessel, and if desired to be simply towed behind such vessel, with maximum stability even at high speeds and great depths, and such a cable can be made in nonsectioned continuous form of indeterminate length, ranging up to thousands of feet, and may be wound up on a suitably sized winch drum without any risk of incurring a permanent set.

It is the object of the present invention to provide a novel end-coupling construction designed for use with a faired cable of the type constituting the invention set forth in the aforesaid Loshigian patent, and in particular to provide end couplings for the finished cable construction which are designed to take advantage of the filimentary nature of the strength member and are adapted to be attached to the same generally after the completion of the various cable body-forming operations.

The foregoing and other objects, characteristics and advantages of the present invention will be more clearly understood from the following detailed description thereof when read in conjunction with the accompanying drawings, in:

FIG. 1 is a fragmentary elevational view of a faired cable of the type referred to hereinbefore and illustrated as connected to a submerged device and a surface or command vessel therefore;

FIG. 2 is a fragmentary, partly sectional, perspective view, on a greatly enlarged scale, of one version of the faired cable;

FIGS. 3 and 4 are transverse cross-sectional views of somewhat modified embodiments of the cable construction;

FIG. 5 is a longitudinal section through an end coupling according to the present invention adapted to be used with such a cable and illustrates the manner of connecting the cable to the submerged device;

FIG. 5A is a perspective exploded view of the end coupling shown in FIG. 5;

FIGS. 5B, 5C and 5D are, respectively, sectional views taken along the lines 5B—5B, 5C—5C and 5D—5D in FIG. 5, FIG. 5D being drawn to a somewhat larger scale; and FIG. 5E is an enlarged, fragmentary, sectional view of the circled portion of FIG. 5 and further illustrates the strength member filament arrangement within the confines of the end coupling.

Referring now to the drawings in greater detail, there is illustrated in FIG. 1 the stern of a surface vessel 30, e.g. an oceanographic exploration ship, riding on the surface of a body of water 31 and provided with a winch drum 32 rotatably supported on bearing blocks or brackets 33. Played out from the drum over an idler guide roll 34 and into the water is a length of cable 35 the construction of which constitutes the subject matter of the aforesaid Loshigian patent. At its remote ends, the cable is provided with respective end couplings 36 (only one is shown), one of which is connected to the winch and the other of which is connected to an underwater detection or exploration device 37. The latter, which per se constitutes no part of the present invention and thus will not be further described herein in any great detail, may for the purposes of this description be taken to be of a self-propelled or maneuverable type within the casing of which is housed any suitable underwater detection and/or scanning system, for example sonar or a television camera. Nevertheless, it should be realized that the device 37 need not be self-propelled but may be a towed device.

As clearly shown in FIGS. 2, 3 and 4, the cable basically has an airfoil cross section and consists in general of a forward strength member 38 and an integral aft or tail member 39, the former being generally U-shaped in cross section so as to provide a channel 38a which extends along the entire length of the strength member. Arranged within the channel 38a near the front edge or bottom of the latter is an electrical power conductor 40. The remainder of the channel 38a is filled with an electrical insulation section which is shown in FIG. 2, where it is designated 41, as extending up to the line of juncture between the strength and aft members 38 and 39. The strength member 38 at its rearwardmost end, i.e. at the end faces of the legs of the U, is further provided with a pair of grooves 42 into which are laid a pair of signal conductors 43. Details of the conductors are set forth in the Loshigian patent. In the embodiment of FIG. 2, the conductors 43 are insulated by the aft or tail member 39, but if desired the insulation section, designated 41a for the cable 35a in FIG. 3 and 41b for the cable 35b in FIG. 4, and preferably composed of an unfilled polyurethane composition as also set forth in the Loshigian patent, may extend beyond the rear end of the strength member, i.e. beyond the juncture line and into the region of the tail member, so as to cover the signal conductors as well. Especially an arrangement such as that shown in FIG. 4 has an additional advantage, in that it enables a larger power conductor to be placed into the channel without any sacrifice of insulation, and in that it also provides a larger thickness of insulation for a normal or below normal size power conductor if that be deemed necessary.

The strength member 38, which is relatively less flexible, in essence comprises a mass of continuous, longitudinally oriented, high modulus filaments 38', preferable glass filaments, embedded in or impregnated with a suitable binder or resin, e.g. an epoxy or epoxy/polyurethane resin. Various possible binder formulations and binder/glass proportions are set forth in the Loshigian patent, to which reference may be had for further details. At the same time, the aft or tail member 39 of the cable, which is relatively more flexible than the strength member, is of a material which comprises a resin supplemented by a filler having a low specific gravity, and as previously indicated, a composite formed primarily of a liquid polyether polyurethane composition admixed with glass microspheres (designated 39' in FIGS. 2, 3 and 4 is preferred. Various formulations for this composite are also set forth in the Loshigian patent to which reference should be had for details.

To enable the end couplings 36 to be connected to the faired cable, predetermined lengths component of the strength member 38 are initially left free and unimpregnated at the opposite ends thereof during the cable manufacturing operation as described in the aforesaid application Ser. No. 685,076, to which reference should be had for details of the operation care being taken to avoid any damage to such unimpregnated filaments until the end couplings are attached thereto. At the same time, of course, enough of the power and signal conductors 40 and 43 are permitted to extend beyond the ends of the molded cable body 35 (or 35a or 35b) to enable the conductors to extend through the couplings and to be connected to the respective electric circuit elements on the control vessel and in the submerged device.

Referring now to FIGS. 5 and 5A in particular, an end coupling 36 according to the present invention preferably comprises an outer hollow stainless steel casing 116 which is adapted to receive a molded fiberglass plug 117 and a stainless steel sleeve 118. The casing is generally cylindrical over the major portion of its length and has external threads 119 at one end for connection to the submerged device or an adjunct of the winding drum. The interior generally cylindrical bore 120 of the casing tapers at the other end of the latter, as shown at 120a while the plug 117 is cylindrical in its middle region and tapered at its opposite end regions 117a and 117b the axial length of the plug being somewhat greater than that of the casing 116. The sleeve 118 has a cylindrical exterior surface and a conically tapered interior bore 121, i.e. its wall is wedge shaped in axial cross section. As clearly shown in FIG. 5A, the plug 117 is further provided with a relatively wide rectangular axial bore 122 and a pair of relatively smaller rectangular bores 123 on opposite sides of and parallel to the bore 122.

To connect the faired cable to the end coupling 36, the unimpregnated end region of the filament component of the strength member is threaded through the casing 116 and around the as yet not inserted plug 117, at which time the filaments may also be sectionalized into a plurality of circumferential layers 45 separated radially by preimpregnated circumferential layers of glass cloth 124 (see FIG. 5E) for the purpose of attaining maximum interlaminar shear properties between the filaments in the coupling. At the same time, the power conductor 40 and the signal conductors 43 are threaded through the bores 122 and 123 of the plug, respectively, and the wedge sleeve 118 is fitted over the filament and glass cloth composite onto the end 117b of the plug 117. During these operations, an epoxy resin binder impregnant is applied to the filaments between the cable body and the end coupling as well as to the filament and glass cloth composite, and the entire assembly is then drawn into the casing 116 to attain the condition shown in FIG. 5. The portion of the bundle of filaments between the cable body and the coupling may be wrapped with one or more layers of a resin-impregnated glass cloth 125 (FIGS. 5 and 5D). The cable and coupling are then subjected to longitudinal tension for tightening the assembly and to a curing operation for the resin-impregnant. As a final step, a flexible resin fairing body (not shown), conforming generally to the stretch of filaments between the cable body and the end coupling, but this will, of course, be done only at that end of the cable which is ultimately to be connected to the submerged device.

Any number of variants within the spirit and scope of the present invention, as defined by the hereto appended claims, will readily suggest themselves to those skilled in the art.

We claim:
1. An end coupling for a cable the strength member of which includes a plurality of elongated, high modulus filaments, comprising an open ended elongated outer casing having an internal bore which is cylindrical over a portion of its length from one end and tapers over the remainder of its length to the other end, an inner plug which is cylindrical over its middle region and tapers toward both ends, said plug in the assembled state of the coupling being axially telescoped into said casing from the cylindrical open end of said bore of the latter so that one of the tapered end sections of said plug is disposed within the confines of the tapered bore portion of said casing, the outer diameter of said plug being less than the diameter of said bore to enable said filaments to extend through said casing in surrounding relation to said plug, and a wedging sleeve having a cylindrical outer surface and a bore which tapers from one end to the other, the outer diameter of said sleeve and the diameter of said bore thereof being, respectively, substantially equal to the diameter of the cylindrical portion of said bore of said casing and greater than the outer diameter of the second tapered end section of said plug, said sleeve in the assembled state of the coupling being oriented with its bore tapering away from the tapered portion of said bore of said casing and being fitted axially and smoothly slidably into said casing at the cylindrical open end of the latter in surrounding relation to said second tapered end section of said plug and, by virtue of the difference in diameter between said bore of said sleeve and said second tapered end section of said plug, to any portions of said filaments overlying the same, whereby with said filaments threaded through said bore of said casing to lie between said plug and said casing over the major portion of the length of said casing from the tapered end of said bore thereof, and for the remainder of said length between said plug and said sleeve, the application of tension between said strength member of said cable and said casing causes those of said filaments within said casing to be clamped tightly between said plug on the one hand and said casing and sleeve entity on the other.

2. An end coupling according to claim 1, said plug being provided with at least one internal bore to afford passage for electrical conductors incorporated in the cable.

3. An end coupling according to claim 2, said casing in the region of said cylindrical open bore end thereof being provided with means enabling connection of the coupling to another device.

4. An end coupling according to claim 1 said plug being made of molded fiberglass, and said casing and said sleeve being made of stainless steel.

5. In a faired cable the body of which includes a strength member composed of a resin-impregnated bundle of elongated, high modulus filaments at least one end section of which is left resin free during the cable body manufacturing operation; and end coupling structure for the cable, comprising an open ended elongated outer casing having an internal bore which is cylindrical over a portion of its length from one end and tapers over the remainder of its length to the other end, an inner plug which is cylindrical over its middle region and tapers toward both ends, said plug having an outer diameter which is less than the diameter of said bore and being telescoped into said casing from the cylindrical open end of said bore with one of the tapered end sections of said plug disposed within the confines of the tapered bore portion of said casing, and a wedging sleeve having a cylindrical outer surface and a bore which tapers from one end to the other, the outer diameter of said sleeve being substantially equal to the diameter of the cylindrical portion of said bore of said casing, the diameter of said bore of said sleeve being greater than the outer diameter of said plug in the region of the second tapered end section of the latter, and said sleeve, oriented with its bore tapering away from the tapered portion of said bore of said casing, being fitted into the latter at said cylindrical open end of said bore of said casing in surrounding relation to said second tapered end section of said plug, said initially resin-free filaments in said end section of said bundle being layered in a resin-impregnated state around said plug and extending through the annular space defined between said plug and said casing over the major portion of the length of said casing from the tapered end of said bore thereof, and for the remainder of said length between said plug and said sleeve, said filaments in said end section of said bundle of filaments being clamped tightly within said casing by the application of tension between said strength member of said cable body and said casing, and said casing in the region of said cylindrical open end of said bore thereof being provided with means enabling connection of the cable to another device.

6. A faired cable according to claim 5, said plug being provided with at least one internal bore to afford passage for electrical conductors incorporated in the cable.

7. A faired cable according to claim 6, further comprising at least one ply of resin-impregnated fiberglass fabric interlaminated with said filaments in said end section of said bundle of filaments at least within the clamped region thereof.

8. A faired cable according to claim 7, said plug being made of molded fiberglass, and said casing and said sleeve being made of stainless steel.

UNITED STATES PATENT OFFICE
CERTIFICATE OF CORRECTION

Patent No. 3,562,406                    Dated    February 9, 197[1]

Inventor(s)    Edwin C. Uhlig et al.

It is certified that error appears in the above-identified patent and that said Letters Patent are hereby corrected as shown below:

Column 1, lines 4 to 9, cancel "The foregoing abstract not to be taken either as a complete exposition or as a limitation of the present invention and in order to understa[nd] the full nature and extent of the technical disclosure of th[is] application, reference must be had to the following detailed description and the accompanying drawings as well as to the claims.", and insert the same as part of the "ABSTRACT". Column 1, line 3, after "1967" insert -- , now U. S. Patent No. 3,530,211, issued September 22, 1970. --; same column 1, before line 10, insert -- This invention relates to faired cables principally adapted for use in guiding both towed an[d] selfpropelled or maneuverable submerged devices through wate[r] for such purposes as underwater exploration and mapping, detection of submarines and other underwater vessels and structures, study of marine plant and animal life and habit[s] etc., and in particular to end couplings for such cables. --

UNITED STATES PATENT OFFICE
CERTIFICATE OF CORRECTION

Patent No. 3,562,406       Dated February 9, 1971

Inventor(s)    Edwin C. Uhlig et al.     Page 2

It is certified that error appears in the above-identified patent and that said Letters Patent are hereby corrected as shown below:

Column 1, line 46, "filimentary" should read -- filamentary line 52, after "in", second occurrence, insert -- which --.

Column 2, line 68, after "lengths" insert -- of the filament

Column 3, line 16, after "117b" insert a comma; line 49, aft

"generally" insert -- to the contours of the cable body, may be molded --; after line 55, insert -- Having thus described the invention, what is claimed and desired to be secured by Letters Patent is: --. Column 4, line 26, after "1" insert a comma; line 70, "6" should read -- 5 --; line 74, "7" should read -- 5 --.

Signed and sealed this 29th day of October 1974.

(SEAL)
Attest:

McCOY M. GIBSON JR.            C. MARSHALL DANN
Attesting Officer              Commissioner of Patents